Nov. 17, 1942.　　R. D. BEAN ET AL　　2,302,593
CONTROL APPARATUS
Filed Feb. 9, 1940

INVENTOR.
ROSCOE D. BEAN
ROY ULLMAN
BY George M. Munschauer
ATTORNEY.

Patented Nov. 17, 1942

2,302,593

UNITED STATES PATENT OFFICE 2,302,593

CONTROL APPARATUS

Roscoe D. Bean, Ambler, and Roy Ullman, Roslyn, Pa., assignors to The Brown Instrument Company, Philadelphia, Pa., a corporation of Pennsylvania Application February 9, 1940, Serial No. 318,204

15 Claims. (Cl. 172—239)

The present invention relates to improvements in follow-up control systems.

An object of the invention is to provide means for increasing the sensitivity of response of follow-up control systems.

Another object of the invention is to provide simple and inexpensive means for minimizing the "dead spot" in the operation of follow-up control systems.

A further object of the invention is to provide in a follow-up control system response to minute changes in the position of the controlling object even though relay means having an appreciable dead spot are employed therein.

A further and more specific object of the invention is to provide means for increasing the sensitivity of response of the controlled object to a reversal in the trend or direction of movement of the controlling object in follow-up control systems.

A still further object of the invention is to provide simple and inexpensive means for minimizing hunting in follow-up control systems.

Still another object of the invention is to provide improved means in a follow-up control system to permit greater load variations, while maintaining stability of operation, than would be possible of attainment without such means.

In order to effect close control of a variable condition at a desired value, it is particularly desirable to effect the needed correction in the controlling medium as soon as possible upon the occurrence of a reversal in the direction of the condition change. In order to attain this end, it has been necessary in the systems of the prior art to employ extremely sensitive relay means in the follow-up control system. The use of less sensitive relay means has not been satisfactory in the prior art systems due to the presence of a dead spot in the system operation, which dead spot is introduced as a result of the insensitivity of the said relay means. Such dead spot is undesirable in that it prohibits quick correction in response to a condition change and thereby permits an appreciable condition change to occur before a correction is initiated. In accordance with the present invention means are provided for compensating for the effect of dead spot in the operation of follow-up control system whereby a correction is quickly made in response to a reversal in the direction of the condition change even though relatively insensitive relay means are employed in the follow-up system.

The arrangement of the present invention is further advantageous in that it may be adapted to effect a magnified correction on reversal in the direction of the condition change. This permits closer control of the condition at the desired value and in addition permits greater variation in the condition load without causing excessive hunting.

The various features of novelty which characterize our invention are pointed out with particularity in the claims annexed to and forming a part of this specification. For a better understanding of the invention, however, its advantages and specific objects attained with its use, reference should be had to the accompanying drawing and descriptive matter in which we have illustrated and described a preferred embodiment of the invention.

Figure 1:
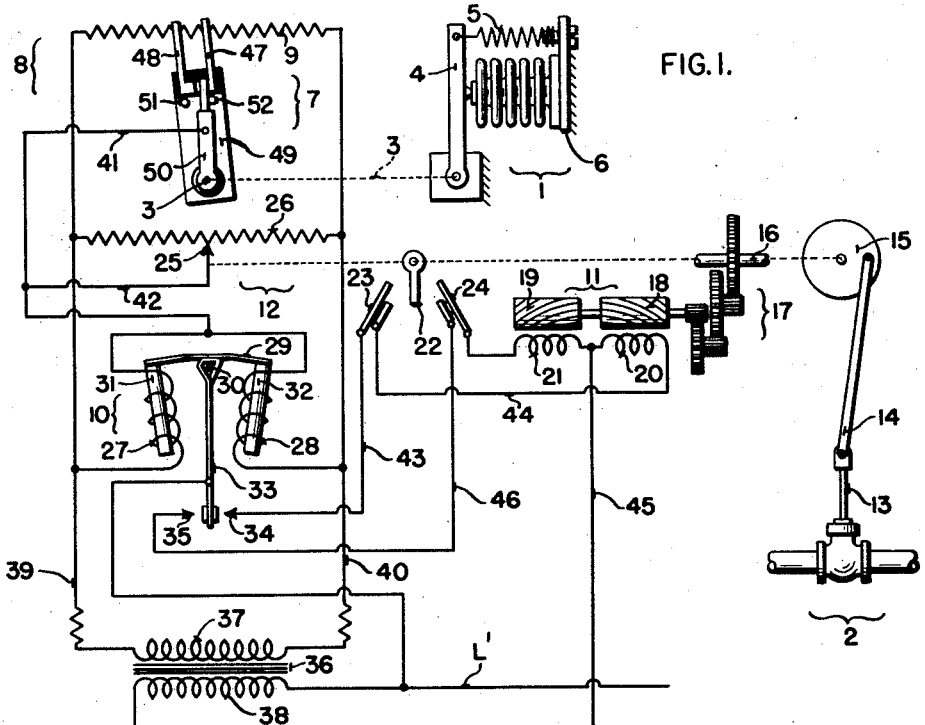
Fig. 1 is a diagrammatic representation of a proportioning control system embodying the invention.

Although the follow-up control system of this invention may be utilized for controlling the value of any variable condition, it is disclosed for purposes of illustration as controlling a temperature condition and more particularly the temperature of a space (not shown) to which a thermostatic device 1 is responsive. The supply of heating fluid to the space is controlled by a valve 2 which is adapted to be adjusted in a plurality of positions under control of the thermostatic device 1 and thereby in response to changes in the temperature of said space.

The thermostatic device 1 may be of any well known type and by way of illustration has been shown as comprising a bellows containing a volatile fluid. The thermostatic device 1 is operatively connected with a shaft 3 and is adapted to give rotational adjustments in one direction or the other thereto on the occurrence of a change in the temperature of the space to which it is subjected. To this end, device 1 operates a lever 4 which is pivoted at one end on the shaft 3, with which it is mechanically rigid, and is biased by a tension spring 5 into engagement with the movable end of the device 1. The spring 5 is rigidly supported at one end by a stationary plate 6, to which the fixed end of device 1 is also anchored, and has its other end connected to the other end of lever 4. Shaft 3 carries a slider 7 which is adapted to be adjusted along the length of a resistance 9 of an electrical control circuit generally designated at 8. The slider 7 and resistance 9 form a control potentiometer. The thermostatic device 1 and thereby the position of the slider 7 along the resistance 9 may be adjusted by suitably varying the tension of the spring 5.

The electrical control circuit 8 comprises a normally balanced bridge circuit and is adapted to have the state of balance thereof varied in accordance with the adjustment of the slider 7 along the resistance 9 and thereby in accordance with changes in the magnitude of the temperature of the space to which the device 1 is subjected. The control circuit 8 controls the operation of a relay generally designated at 10, which, in turn, controls the operation of a reversible electrical motor 11. The motor 11 positions the valve 2 and also operates a follow-up means designated at 12. The follow-up means 12, in turn, controls the operation of the relay 10 providing a true follow-up control system.

Valve 2 is shown as operated by a stem 13 which is connected by a pitman 14 to a crank disc 15 carried by a shaft 16 of the motor 11. The shaft 16 is operated through a reduction gear train 17 by motor rotors 18 and 19. The rotors 18 and 19 are rigidly connected to each other and are controlled by respective field windings 20 and 21, the arrangement being such that when the field winding 20 is energized, valve 2 is adjusted to an open position and when the field winding 21 is energized, the valve 2 is moved toward a closed position.

Shaft 16 also operates an abutment member 22 for opening limit switches 23 and 24 and thereby deenergizing the motor when the valve 2 has been adjusted to an extreme open position or an extreme closed position, respectively. The shaft 16 also operates a slider 25 along the length of a potentiometer resistance 26. The slider 25 and resistance 26 comprise the follow-up means 12 referred to hereinbefore, and for convenience hereinafter will be referred to as the balancing potentiometer. When the valve 2 is moved toward an open position, the slider 25 is moved to the left, and when the valve 2 is moved toward a closed position, the slider 25 is moved toward the right.

The relay generally designated at 10 includes a pair of coils 27 and 28 which are disposed in operative relation with a balanced armature 29. Armature 29 is pivoted for rotation at 30, a point intermediate its ends, and carries iron cores 31 and 32 at each end which are adapted to move into and out of the coils 27 and 28, respectively. The armature 29 also carries a switch blade 33 which is disposed between a pair of stationary contacts 34 and 35. When the coils 27 and 28 are equally energized, the switch blade 33 is held intermediate and out of engagement with both of the contacts 34 and 35; but when one of the coils 27 or 28 is energized to a greater extent than the other, the switch blade is moved into engagement with one or the other of the contacts 34 or 35.

Electrical power is supplied the relay 10 from the secondary winding 37 of a step-down transformer having a primary winding 38 connected across alternating current supply line wires L¹ and L². The left end terminal of the transformer secondary winding 37 is connected by a wire 39 to the bottom terminal of the relay coil 27 as seen in Fig. 1 and the right end terminal of the winding is connected by a wire 40 to the bottom terminal of the coil 28. Wire 39 is also connected to the left end terminals of the control and balancing potentiometer resistances 9 and 26, and wire 40 is also connected to the right end terminals of those resistances. The upper terminals of the coils 27 and 28 are connected together and are also connected by wires 41 and 42 to the slider 7 of the control potentiometer and to the slider 25 of the balancing potentiometer, respectively. By reason of these connections, it is seen that the control potentiometer and the balancing potentiometer are connected in parallel with each other and with the series connected relay coils 27 and 28, and that this parallel circuit is connected between the terminals of the transformer secondary winding 37.

When the temperature of the space to which the thermostatic device 1 is subjected is at the desired normal value, the sliders 7 and 25 will be in approximately the positions shown, and the valve 2 will be in a midposition, that is, approximately half open. Upon a decrease in the space temperature, the bellows element of the thermostatic device 1 will contract and as a result effect an adjustment of the slider 7 to the right. Because of the parallel relationship of the circuit elements 9, 26, and 27, 28 noted above, the energization of the relay coil 28 is decreased and the energization of the coil 27 is increased. As a result of such unequal energization of the coils 27 and 28, the switch blade 33 is moved into engagement with the stationary contact 34 to complete an energizing circuit to the motor field winding 20 which may be traced from supply line wire L¹, switch blade 33, contact 34, a conductor 43, limit switch 23, a conductor 44, field winding 20, and a conductor 45 to the other supply line wire L². Completion of this circuit effects rotation of motor 11 in the direction to adjust the valve 2 toward an open position to thereby increase the supply of heat to the space. Rotation of motor 11 in this direction also produces an adjustment of the slider 25 to the left along resistance 26. Movement of the slider 25 in this direction decreases the energization of the relay coil 27 and increases the energization of the coil 28 and continues until the energization of the coils 27 and 28 has been equalized. This causes the switch blade 33 to move out of engagement with the contact 34 and consequently to deenergize the motor field winding 20. In this manner, the valve 2 is modulated to an open position in accordance with the decrease in space temperature.

Upon an increase in space temperature, the bellows element of the thermostatic device 1 will expand and thereby effect an adjustment of the slider 7 to the left. Such movement of the slider 7 decreases the energization of the relay coil 27 and increases the energization of the coil 28. The switch blade 33 is then moved into engagement with the stationary contact 35 to complete an energizing circuit to the motor field winding 21 which may be traced from the supply line wire L¹ to switch blade 33, contact 35, a conductor 46, limit switch 24, motor field winding 21, and conductor 45 to the other supply line wire L². Completion of this circuit energizes the motor 11 for rotation in the direction to move the valve 2 towards a closed position. Such operation of the motor also effects an adjustment of the slider 25 to the right and thereby decreases the energization of the relay coil 28 and increases the energization of the coil 27. When the slider 25 has moved sufficiently far to the right to equalize the energization of the coils 27 and 28, the switch blade 33 is moved out of engagement with the contact 35 to break the circuit to the motor field winding 21. In this manner the valve 2 is modulated toward a closed position in accordance with the amount of increase in space temperature.

By reason of the above construction, a true follow-up control system is provided. In similar systems of the prior art, however, it has been necessary to provide an extremely sensitive relay 10 having a negligible dead spot to obtain quick response in the adjustment of the valve 2 following a reversal in the temperature of the space under control. The need for an extremely sensitive relay 10 has been avoided in accordance with the present invention wherein the effect of insensitivity of operation of the relay 10 has been minimized whereby the latter may have an appreciable dead spot without adversely affecting the system operation.

To this end the slider 7 is provided with a pair of contacts 47 and 48 which are held, spaced apart, in engagement with the control resistance 9 and are adapted to slide therealong as the bellows element of the thermostatic device 1 expands and contracts. The contacts 47 and 48 are carried on the upper end of an arm 49, which is journalled for rotation on the shaft 3 at its lower end. The upper end of arm 49 is desirably of insulating material, as shown so that the contacts 47 and 48 are insulated from each other and from arm 49. The lower ends of the contacts 47 and 48 are separated by only a slight distance and are operatively associated with a contact arm 50, the lower end of which is rigid with the shaft 3. The contact arm 50 is wide enough to bridge the gap between the lower ends of contacts 47 and 48, but is normally held in engagement with only one of the contacts at a time. The arm 50 is adapted to be moved by the shaft 3 relatively to the arm 49, but the extent of such relative movement is limited to a movement from one of the contacts 47, 48 to the other by a pair of stops 51 and 52 which are positioned on opposite sides of the arm 50 and are carried by the arm 49. Further movement of the shaft 3 causes the arm 50 to carry the arm 49 along with it and thereby effects an adjustment of the contacts 47 and 48 along the resistance 9. The arm 49 is frictionally held in any convenient manner, for example, by the pressure of contacts 47 and 48 against resistance 9 so that a limited movement of the contact arm 50 from one contact 47, 48 to the other does not cause movement of the arm 49.

It will be noted that movement of the contact arm 50 from one contact 47, 48 to the other suddenly shifts the point of engagement of the wire 41, which wire is connected to the junction of relay coils 27 and 28, from one point to another along the resistance 9. The effect of reversal in the direction of movement of arm 50 caused by a change in trend of the space temperature thus is to produce a sudden and appreciable change in the amount of resistance connected in shunt to the relay coils 27 and 28. Such sudden change in the amount of resistance connected in shunt to the relay coils 27 and 28 is effective, when the contacts 47 and 48 are properly spaced apart, to exactly compensate for the insensitivity of the relay 10 whereby the latter will actuate the switch blade 33 into engagement with one or the other of the contacts 34 and 35 immediately on a change in trend of the temperature of the space under control. Thus, with the structure described, the motor 11 will be quickly energized for rotation in one direction or the other to effect a correspondingly quick adjustment of the valve 2 in response to a change in trend of the space temperature.

By thus quickly producing a correction in the adjustment of the valve 2 in response to a change in the direction of the space temperature change, the correction needed to prevent a further space temperature change and to restore the space temperature to the desired value will be effected before the space temperature has departed appreciably from the desired value. As a result the hunting tendency of the system will be minimized and a smoother and closer control of the space temperature at the desired point will be obtained.

As will be clear to those skilled in the art, it is possible to obtain with the arrangement of our invention a magnified adjustment of the valve 2 on a change in the trend of the space temperature whereby the space temperature will be quickly restored to the desired value on deviation therefrom, thus further reducing the hunting tendency of the system. This desirable effect may be obtained by suitably increasing the distance between the contacts 47 and 48. Thus on a reversal in the direction of movement of the contact arm 50, the motor 11 will produce a magnified adjustment of the valve 2. Such magnified adjustment of the valve 2 will tend to quickly stop the space temperature from further departing from the desired value and secondly will effect a return of the space temperature to the desired value in a shorter time than would be possible of attainment if such magnified correction had not been made. It will also be noted that a further advantage which is obtained by effecting such magnified adjustment of the valve 2 is that the variations in the space temperature are reduced in magnitude and in addition greater variations in the heat requirements of the space may be permitted without rendering the system unstable in operation or causing a reduction or "droop" in the space temperature.

Figures 2, 3:
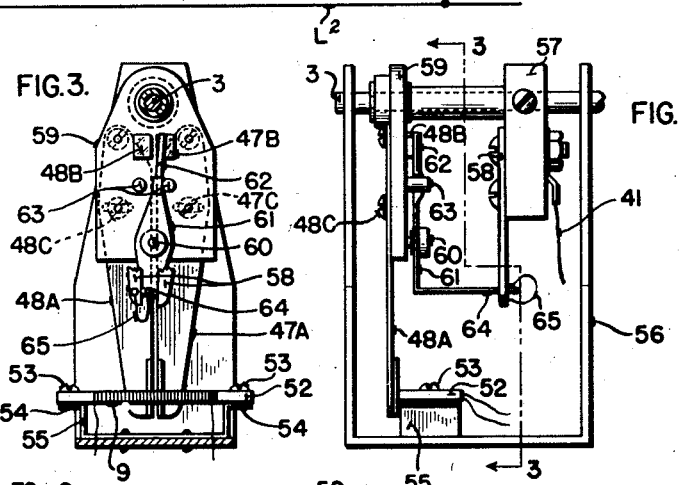
Fig. 2 is an end elevation of a modification of a portion of the arrangement of Fig. 1.
Fig. 3 is a view of the arrangement of Fig. 2 taken along the lines 3—3.

In Figs. 2 and 3, we have illustrated, more or less diagrammatically, a preferred embodiment of the control potentiometer of the Fig. 1 arrangement. As shown, Fig. 3 is an end view taken along the lines 3—3 of Fig. 2. In this embodiment of our invention, the potentiometer resistance 9 is shown as wound on a strip of insulating material 52 which is fastened by screws 53 to flanges 54 formed on the upper ends of the legs of a U-shaped member 55. Member 55, in turn, is fastened by rivets or other means to the upper surface of the bottom part of a U-shaped plate member 56. The shaft 3 is journaled through the upper ends of the legs of the plate member 56. Rigidly attached to the shaft 3 for rotation therewith is a block 57, of insulating material, upon which is mounted a conducting plate 58, in electrical connection with conductor 41. Loosely journaled on the shaft 3 is another insulating block 59, which carries on the side opposite block 57, two spaced contacts 47A and 48A, corresponding to contacts 47 and 48 of Fig. 1. Contacts 47A and 48A engage potentiometer resistance 9 at their lower ends. Mounted on the side of block 59 toward block 57 are two smaller contacts 47B and 48B which are in electrical contact by means of conductors (not shown) passing through block 59, with contacts 47A and 48A, respectively. Pivotally supported, as at 60, on the side of block 59 toward block 57 is a double-armed contact lever 61. One arm 62 of lever 61 extends over the contacts 47B and 48B for engagement therewith. Arm 62 is wider than the gap between contacts 47B and 48B, and is limited in its rotation about pivot 60 by stops 63, attached to the block 59. The arm 62 is therefore always in engagement with one or the other of the contacts 47B or 48B or both, the latter case existing when arm 62 is shifting from one contact to the other. A second arm 64 of lever 61 is bent toward block 57 and its end engages a slot in the end of plate 58. In order to insure good electrical contact between lever arm 61 and plate 58, a conductor 65 is soldered or otherwise fastened to these elements.

When the parts are in the position shown in Fig. 3, the conductor 41 is connected through plate 58, conductor 65, contact lever arm 64, arm 62, contact 47B, and contact 47A to potentiometer resistance 9. When, in response to a change in temperature, shaft 3 begins to turn counterclockwise from the position shown, block 57 and plate 58 move with it, and the latter engages lever arm 64 and moves it so as to shift contact lever 62 from contact 47B to contact 48B, thus shifting the point of connection of conductor 41 and resistance 9 from contact 47A to contact 48A. As soon as lever 62 engages stop 63, block 59 and its attached contacts 47A and 48A are moved counter-clockwise in response to rotation of shaft 3. Therefore, a sudden unbalancing of the potentiometer circuit results from a reversal of the direction of rotation of shaft 3. The extent of this sudden unbalancing of the potentiometer circuit may be varied by varying the spacing between contacts 47A and 48A. To this end the contacts 47A and 48A are fastened by screws 47C and 48C to the plate 59 and are slotted so that any desired spacing within limits between the contacts 47A and 48A may be had.

Figures 4, 5:
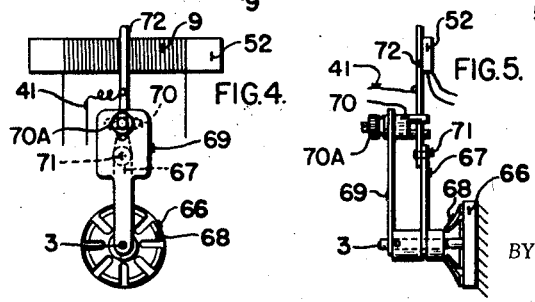
Figs. 4 and 5 are front and end views, respectively, of another modification of a portion of the arrangement of Fig. 1.

In Figs. 4 and 5 we have illustrated another embodiment of the control potentiometer in which the advantageous features of the previous arrangements may be obtained by means of a single contact engaging the resistance 9. In this embodiment, as seen in Fig. 5, the shaft 3 is journalled in a base member 66. An arm 67 of insulating material is loosely journalled on shaft 3 and is held in frictional engagement with base member 66 by a friction disc 68. Another insulating arm 69 is rigid with shaft 3 and supports at its outer end a fork shaped member 70, the prongs of which are disposed on opposite sides of an arm 72 which is pivotally supported as at 71 on the end of arm 67. One of the prongs of member 70 is shown as slightly displaced in Fig. 5 for the sake of clarity. A slot is provided in the upper end of arm 69 for receiving member 70 so that the vertical position of member 70 with respect to arms 69 and 72 may be adjusted. To this end a knob 70A is provided for securing member 70 to arm 69 thus facilitating such adjustment. The arm 72 engages the potentiometer resistance 9 at its upper end and is electrically connected to the conductor 41 in any suitable manner.

When the shaft 3 begins to move from a position of rest, for example, in a counter-clockwise direction, pivot 71 remains stationary because arm 67 is frictionally held against base member 66. Contact lever 72 is therefore rotated about the pivot 71 under the influence of one of the prongs of member 70 on arm 69. After this motion has continued a certain distance, the angular position of lever 72 with respect to arm 69 causes both prongs of member 70 to bind against lever 72, and upon further counter-clockwise motion of shaft 3 and arm 69, lever 72 and arm 67 will follow, the relative positions of the moving parts remaining the same. During this further motion, contact 72 is rotating about shaft 3 as a center. On contact lever 72, the distance between the point of application of one of the prongs of member 70 of the force causing rotation and the center of rotation is smaller during the first phase of the movement, when the center is at pivot 71, than during the last phase, when the center is at shaft 3. Therefore, when the member 70 moves through a given distance, the angle moved through by contact lever 72, and hence the distance the point of contact moves along resistance 9, are proportionately greater during the first phase of movement than during the last phase. This arrangement thus causes a sudden unbalancing of the potentiometer during the first phase of movement, which occurs whenever the direction of motion of shaft 3 is reversed. The extent of such sudden unbalancing may be adjusted by varying the position along arm 69 at which member 70 is secured, which may be done by manipulation of knob 70A.

While in accordance with the provisions of the statutes, we have illustrated and described the best forms of embodiment of our invention now known to us, it will be apparent to those skilled in the art that changes may be made in the form of the apparatus disclosed without departing from the spirit of our invention as set forth in the appended claims and that in some cases certain features of our invention may be used to advantage without a corresponding use of other features.

Having now described our invention, what we claim as new and desire to secure by Letters Patent is:

1. In combination, a potentiometer resistance, a contact device disposed in engagement with said resistance and adapted to be adjusted along the length thereof, means for moving said contact device along the length of said resistance, and means physically associated with and interposed between said device and said moving means and operative on a reversal in the direction of movement of said moving means irrespective of the position of said contact device along said resistance to produce a disproportionately large change in the effective electrical point of contact of said contact device along said resistance relatively to the extent of movement of said moving means.

2. In combination, an elongated impedance, a device disposed in operative relation with said impedance and adapted to be adjusted along the length thereof, means to move said device along the length of said impedance, and means physically associated with and interposed between said device and said moving means and operative on a reversal in the direction of movement of said moving means irrespective of the position of said device along said impedance to produce a disproportionately large change in the operative electrical position of said device along said impedance relatively to the extent of movement of said moving means.

3. In combination, an elongated member, a device disposed in operative relation with said member and adapted to be adjusted along the length thereof, means to move said device along the length of said member, and means physically associated with and interposed between said device and said moving means and operative on a reversal in the direction of movement of said moving means irrespective of the position of said device along said member to produce a disproportionately large change in the operative electrical position of said device along said member relatively to the extent of movement of said moving means.

4. In combination, a potentiometer resistance, a device disposed in operative relation with said resistance and adapted to be adjusted along the length thereof, said device including a pair of contacts which are insulated from each other and are held, spaced apart, by said device into engagement with said resistance, means for moving said device along the length of said resistance, a contact device disposed in operative relation with said contacts and normally maintained in engagement with only one of said contacts, and means operative on a reversal in the direction of movement of said moving means to adjust said contact device from one of said contacts to the other.

5. In combination, a potentiometer resistance, a device disposed in operative relation with said resistance and adapted to be adjusted along the length thereof, said device including a pair of contacts which are insulated from each other and are held, spaced apart, into engagement with said resistance, means for varying the spacing between said contacts, means for moving said device along said resistance, a contact device disposed in operative relation with said contacts and normally held in engagement with only one of said contacts, and means operative on a reversal in the direction of movement of said moving means to adjust said contact device from one of said contacts to the other.

6. In combination, an elongated impedance, a device disposed in operative relation with said impedance and adapted to be adjusted along the length thereof, means for moving said device along the length of said impedance, means physically associated with and interposed between said device and said moving means and operative on a reversal in the direction of movement of said moving means irrespective of the position of said device along said impedance to produce a disproportionately large change in the operative electrical position of said device along said impedance relatively to the extent of movement of said moving means, and means to vary the extent of magnification of the change produced in the effective position of said device along said impedance by said second mentioned means.

7. In combination, a normally balanced electrical network including a control potentiometer resistance and a balancing potentiometer resistance, relay means connected to said network and responsive to the state of balance thereof, a contact device disposed in engagement with said control potentiometer resistance and adapted to be adjusted along the length thereof, means for moving said contact device along the length of said control potentiometer resistance to thereby unbalance said network, means controlled by said relay means to adjust said balancing potentiometer resistance to rebalance said network on unbalance thereof, and means physically associated with and interposed between said device and said moving means and operative on a reversal in the direction of movement of said moving means, irrespective of the position of said contact device along said control potentiometer resistance, to produce a disproportionately large change in the effective electrical point of contact of said contact device along said control potentiometer resistance relatively to the extent of movement of said moving means.

8. In combination, a normally balanced electrical network including an elongated control impedance, relay means connected to said network and responsive to the state of balance thereof, a device disposed in operative relation with said impedance and adapted to be adjusted along the length thereof, means to move said device along the length of said impedance to thereby unbalance said network, means controlled by said relay means to rebalance said network on unbalance thereof, and means physically associated with and interposed between said device and said moving means and operative on a reversal in the direction of movement of said moving means, irrespective of the position of said device along said impedance, to produce a disproportionately large change in the operative electrical position of said device along said impedance relatively to the extent of movement of said moving means.

9. In combination, a normally balanced network including a control potentiometer resistance, relay means connected to said network and responsive to the state of balance thereof, a device disposed in operative relation with said resistance and adapted to be adjusted along the length thereof, said device including a pair of contacts which are insulated from each other and are held, spaced apart, by said device into engagement with said resistance, a contact device disposed in operative relation with contacts and normally maintained in engagement with only one of said contacts, means for moving said device along the length of said resistance to thereby unbalance said network, means controlled by said relay means to rebalance said network on unbalance thereof, and means operative on reversal in the direction of movement of said moving means to adjust said control device from one of said contacts to the other.

10. In combination, a normally balanced network including a control potentiometer resistance and a balancing potentiometer resistance electrically connected, relay means connected to said network and responsive to the state of balance thereof, a contact device disposed in engagement with said control potentiometer resistance and adapted to be adjusted along the length thereof, means for moving said contact device along the length of said control potentiometer resistance to thereby unbalance said network, means controlled by said relay means to adjust said balancing potentiometer resistance to rebalance said network on unbalance thereof, and means physically associated with and interposed between said device and said moving means and operative on a reversal in the direction of movement of said moving means to produce a disproportionately large change in the effective electrical point of contact of said contact device along said control potentiometer resistance relatively to the extent of movement of said moving means.

11. In combination, a normally balanced electrical network including a control impedance, relay means connected to said network and responsive to the state of balance thereof, a device disposed in operative relation with said impedance and adapted to be adjusted relatively thereto, means to adjust said device relatively to said impedance to thereby unbalance said network, means controlled by said relay means to rebalance said network on unbalance thereof, and means physically associated with and interposed between said device and said moving means and operative on a reversal in the direction of movement of said moving means to produce a disproportionately large change in the operative electrical position of said device along said impedance relatively to the extent of movement of said moving means.

12. In combination, a device to be adjusted in a plurality of positions for controlling the value of a variable condition, means for controlling the adjustment of said device comprising a normally balanced electrical network including a control impedance, means connected to said network and responsive to the state of balance thereof, a device disposed in operative relation with said impedance and adjusted relatively thereto in accordance with changes in the value of the condition under control to thereby unbalance said network, means controlled by said responsive means to rebalance said network on unbalance thereof and to simultaneously effect a corrective adjustment of said first mentioned device, and means physically associated with and interposed between said second mentioned device and said impedance and operative on a reversal in the condition trend irrespective of the position of said second mentioned device relatively to said impedance to produce an adjustment of the operative electrical position of said second mentioned device relatively to said impedance which is disproportionately large compared to the extent of the condition change whereby a correspondingly disproportionately large correction in the adjustment of said first mentioned device is produced.

13. The combination of claim 12 and means to vary the extent of the magnification of the change produced in the operative electrical position of said device along said impedance by said last mentioned means.

14. In combination, a device to be adjusted in a plurality of positions for controlling the value of a variable condition, means for controlling the adjustment of said device comprising a normally balanced network including a control potentiometer resistance and a balancing potentiometer resistance electrically connected, means connected to said network and responsive to the state of balance thereof, a device disposed in operative relation with said control potentiometer resistance and adjusted along the length thereof in accordance with changes in the value of the condition under control to thereby unbalance said network, means controlled by said responsive means to adjust said balancing potentiometer resistance to rebalance said network on unbalance thereof and to simultaneously effect a corrective adjustment of said first mentioned device, and means physically associated with and interposed between said second mentioned device and said control potentiometer resistance and operative on a reversal in the condition trend to produce a disproportionately large adjustment of the operative electrical position of said second mentioned device along said control potentiometer resistance relatively to the extent of the condition change whereby a correspondingly disproportionately large correction in the adjustment of said first mentioned device is produced.

15. The combination of claim 14 and means to vary the extent of the magnification of the change produced in the operative electrical position of said device along said impedance by said last mentioned means.

ROSCOE D. BEAN.
ROY ULLMAN.